No. 825,500. PATENTED JULY 10, 1906.
T. SUZUKI.
PROCESS OF BREWING SOY.
APPLICATION FILED JULY 5, 1904.
2 SHEETS—SHEET 1.
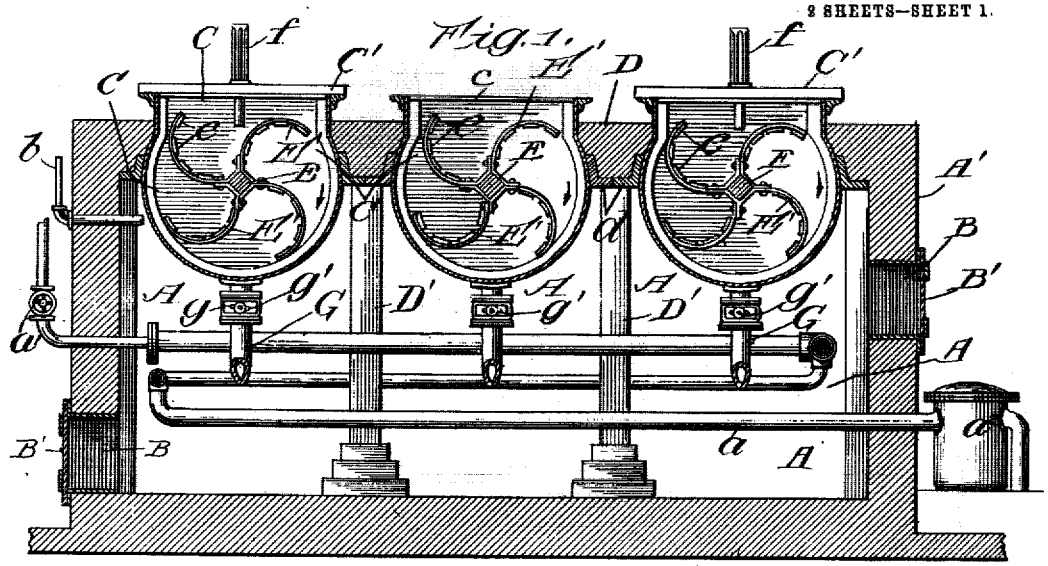
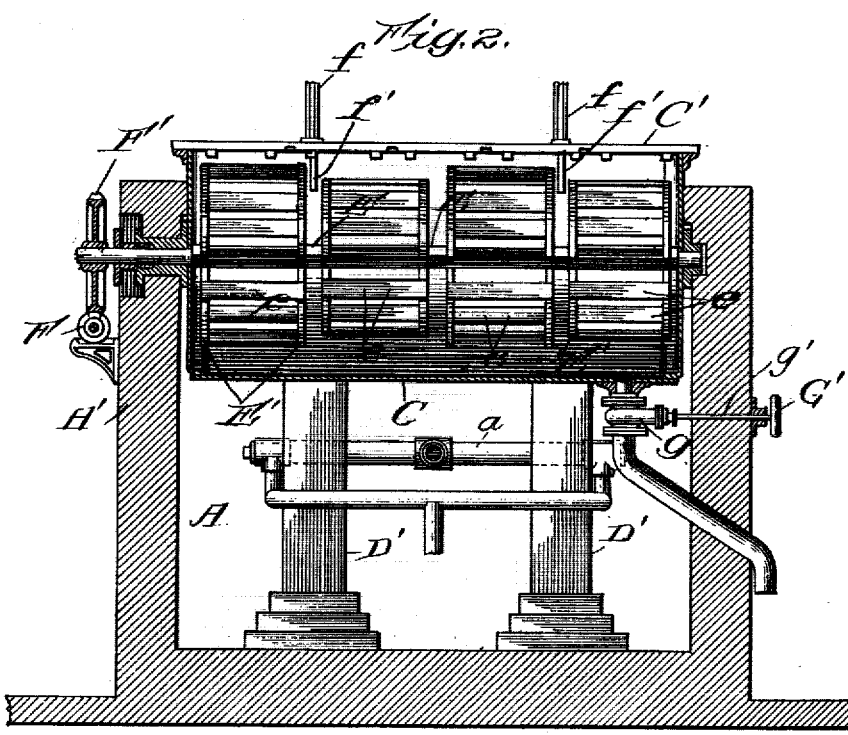
Witnesses:
Inventor
Tozaburo Suzuki.
by B. Singer
Attorney.

No. 825,500. PATENTED JULY 10, 1906.
T. SUZUKI.
PROCESS OF BREWING SOY.
APPLICATION FILED JULY 5, 1904.
2 SHEETS—SHEET 2.
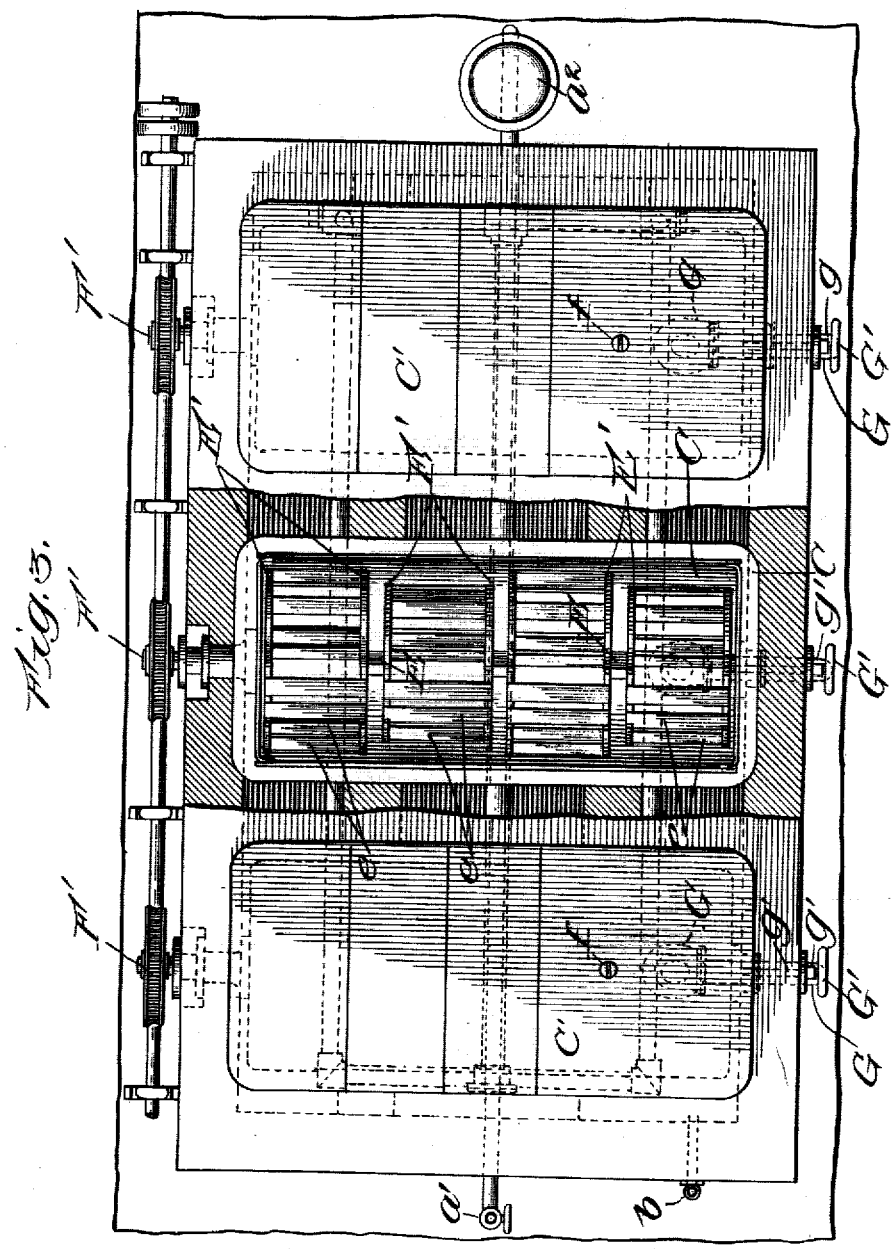
Witnesses:
Inventor:
Tozaburo Suzuki
By B. Singer
Attorney

UNITED STATES PATENT OFFICE.

TOZABURO SUZUKI, OF SUNAMURA, JAPAN.

PROCESS OF BREWING SOY.

No. 825,500.　　　　Specification of Letters Patent.　　　　Patented July 10, 1906.

Application filed July 5, 1904. Serial No. 215,382.

*To all whom it may concern:*

Be it known that I, TOZABURO SUZUKI, a subject of the Emperor of Japan, residing at Sunamura, Prefecture of Tokyo, Empire of Japan, have invented certain new and useful Improvements in Processes for Brewing Soy, of which the following is a specification.

Attempts have been made recently to brew soy in a shorter time and easier way than in the process hitherto in vogue. In some cases the plan adopted was to raise the temperature of the entire brewing-room; but this was not a success on account of constant fluctuations in temperature caused by the entry and exit of operators and employees. In other cases steam-heated coils were run through the mash-tanks; but this was also a failure, for the reason that while the mash in direct contact with the coils was heated to excess it was impossible to give moderate, equal, and uniform temperature to the entire contents of the tank.

In my invention I prepare the mash originally with a less amount of salt than heretofore has been the custom and subject it to slow and uninterrupted stirring in tanks or receptacles exposed to moderate external heat from a closed heating-chamber, so as to keep the mash at a constant and uniform temperature until the fermentation is thoroughly completed. Then more salt is added to regulate the quality of the soy, the object being to obviate defects, including those above enumerated, in the methods of brewing heretofore employed, to accelerate the maturing of the soy, and to manufacture the largest possible quantity in a shorter time and in all seasons and conditions of weather.

More particularly, the process is as follows: The soy-yeast is prepared with about 5.10 bushels of barley and 5.13 bushels of soybeans, to which is added salt water prepared by adding about 2.05 to 3.6 bushels of dissolved salt to about 63.52 imperial gallons of boiling water, the quantity of salt being one-third to one-half less than in mash prepared in the usual way. The mash thus prepared is put in suitable tanks and subjected to constant and slow stirring, the tanks being exposed to moderate heat from outside the tanks, shielded from fluctuations, so as to keep the contents of the tanks constantly at a temperature of about 18° to 30° centigrade. The tanks are sometimes closed by a cover and supplied with pasteurized air. Stirrers in the tank slowly and constantly turn the mash up from the bottom and pour it over the surface, which is gradually carried to the bottom and then again to the top. In this manner every particle of the mash is equally and uniformly exposed to the air, and the fermentation is rapid, thorough, and effective, the mash being completely matured within a short time, owing to the abundant supply of oxygen. The maturing is attended with a sudden fall of temperature in the mash, indicated by thermometers connected with the tanks. In order to regulate at pleasure the quality of the soy and the relative proportion of salt in it, salt water made by dissolving 1.5 to three bushels of salt in eight to sixteen imperial gallons of boiling water and cooled is from time to time mixed in the mash in suitable quantities and stirring is kept up for several days until the brew is completed. Then the mash is drawn off, leaving, however, a moderate supply to be mixed with succeeding charge.

In the process hitherto in vogue only sudden and violent stirring is given to the mash for a minutes at a time, naturally resulting in unequal fermentation even in moderate temperature, often leaving one part unfermented while other parts are already fermented. The surface is left infected with germs, and as these tend to putrefaction the action of fermentation is prevented. For this reason it is necessary to mix in a large amount of salt for antiseptic purposes; but such excessive addition of salt prevents the dissolution of organic matters contained in the mash. In the present invention the fermentation is not unequal, as the mash is continually stirred slowly, and germs are prevented from infecting its surface, and since a large part of the salt is mixed with the mash after it is matured the antifermentation action of the salt is minimized, so that maturity is not only reached in an extraordinary short time, but almost all organic substances are reduced to a soluble state, producing the largest possible quantity of soy from a given charge.

In the drawings, Figure 1 is a longitudinal sectional elevation of apparatus for carrying out the process, the tank-covers, however, being unsectioned. Fig. 2 is a transverse sectional elevation, except that the tank-cover is not sectioned; and Fig. 3 is a top plan view, partly broken away and with the cover of the central tank removed to expose the stirrers within.

A represents a closed heat-chamber having thick masonry walls A' and which is kept at a practically constant temperature of 20° to 30° centigrade by suitable means—for example, by steam, hot water, or heated air introduced through the convoluted pipe $a$, provided with regulating-valve $a'$ in the discharge branch, the receiving branch in case steam is used connecting with steam-trap $a^2$ outside the chamber. A ventilation port or ports B, closed by door B', is cut through the wall of the chamber, through which cool air may be admitted into the room if thermometer $b$, connected with said chamber, shows it to be necessary or if the heating period has passed.

The cylindrical tanks C, having openings $c$ at the top, which are advisably fitted with removable covers C', are laid horizontally in the mason-work above the heating-chamber parallel with each other where there are more than one and so as to expose practically all of the body holding the charge to the heat-rays therein. The intervals between the tanks are filled in with concrete or mason-work D, laid in metal troughs $d$, supported upon columns D', as shown. Centrally through each tank passes a stirrer-shaft E, which is provided with stirrer-arms E', preferably curved forward in the direction of rotation, and each pair connected by spaced slats $e$, so as to form a series of sets of stirrer-wings separated from each other by short intervals and the wings of one set lagging behind those of the next adjacent set. Owing to the arrangement and construction of these wings, the mash is scooped up from the bottom and delivered upon the surface, while a continuous flow is caused from one end of the tank to the other and back again, resulting in a thorough exposure of every particle to the oxygen of the air. The stirrer-shafts are revolved slowly by means of worm-shaft F and worm-wheels F', arranged alongside and to the exterior of one lateral of the heating-chamber. Thermometers $f$ are provided, entering the tanks in any convenient way—as, for instance, through the covers—so that the temperature may be taken, and a nipple $f'$ may also be provided, whereby pasteurized air may be introduced into the closed tank. The covers being removable may be taken off in dry weather, but replaced in wet weather or whenever it is desired to introduce pasteurized air. The base of each tank is provided with a draw-off pipe G, having stop-cock $g$, which may be manipulated by stem $g'$ and hand-wheel G' at the exterior of the heating-chamber.

The apparatus herein described is made the subject of an independent application filed concurrently herewith, Serial No. 215,381, and no claim is made to it herein.

Having thus described my improved process and suitable means for carrying it out, what I claim, and desire to secure by Letters Patent, is—

The improvement in the art of manufacturing soy, consisting in initially mixing in proportions of approximately 5.10 bushels of barley 5.13 bushels of soy-beans, adding about 2.05 to 3.6 bushels of salt dissolved in 63.52 imperial gallons of boiling water, slowly and continuously stirring under a substantially constant heat until matured, then adding further saline solution and continuing the stirring for several days.

In testimony whereof I affix my signature in presence of two witneseses.

TOZABURO SUZUKI.

Witnesses:
R. S. MILLER,
U. ISHIWARA.